United States Patent
Mischer et al.

(10) Patent No.: US 9,902,294 B2
(45) Date of Patent: Feb. 27, 2018

(54) SEAT TRACK HAVING SELECTABLE END STOP POSITIONS

(71) Applicant: Lear Corporation, Southfield, MI (US)

(72) Inventors: Hans-Peter Mischer, Bad Meinberg (DE); Michael Wojatzki, Ennigerloh (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 13/711,652

(22) Filed: Dec. 12, 2012

(65) Prior Publication Data

US 2013/0200243 A1 Aug. 8, 2013

(30) Foreign Application Priority Data

Feb. 3, 2012 (DE) .................. 10 2012 201 584

(51) Int. Cl.
B60N 2/07 (2006.01)
(52) U.S. Cl.
CPC ......... B60N 2/0727 (2013.01); B60N 2/0705 (2013.01); B60N 2/0715 (2013.01)
(58) Field of Classification Search
CPC .. B60N 2/0727; B60N 2/0705; B60N 2/0843; B60N 2/0818; B60N 2/0715; B60N 2/067; B60N 2/02; B60N 2/04; B60N 2/06; B60N 2/01508; B60N 2/01516; B60N 2/08; B60N 2/0806; B60N 2/0825; B60N 2/085; B60N 2/0837
USPC .............. 248/424, 425, 429, 430; 296/65.13, 296/65.14, 65.15
See application file for complete search history.

(56) References Cited

U.S. PATENT DOCUMENTS

| | | | | |
|---|---|---|---|---|
| 3,806,190 A | * | 4/1974 | Winslow ................. | B60N 2/06 297/216.18 |
| 5,222,814 A | * | 6/1993 | Boelryk ................. | B60N 2/072 248/430 |
| 5,820,216 A | | 10/1998 | Feuillet | |
| 5,918,846 A | * | 7/1999 | Garrido ................. | B60N 2/123 248/424 |
| 6,113,051 A | * | 9/2000 | Moradell ............. | B60N 2/0705 248/430 |
| 6,364,272 B1 | * | 4/2002 | Schuler ................. | B60N 2/072 248/424 |
| 6,616,233 B1 | | 9/2003 | Debus et al. | |

(Continued)

FOREIGN PATENT DOCUMENTS

| CN | 101716895 A | 6/2010 |
|---|---|---|
| DE | 10039511 A1 | 2/2002 |

(Continued)

OTHER PUBLICATIONS

German Priority application, Office Action dated Oct. 5, 2012.

*Primary Examiner* — Muhammad Ijaz
(74) *Attorney, Agent, or Firm* — MacMillan, Sobanski & Todd, LLC (57) ABSTRACT

A seat track assembly includes a moveable rail configured to support a seat and a stationary rail configured to be mounted to a floor structure. The moveable rail is selectively positioned relative to the stationary rail is a plurality of use positions. The moveable and stationary rails include end stop structures that cooperate to adjust the overall travel length and travel midpoint position of the moveable rail relative to the stationary rail.

7 Claims, 5 Drawing Sheets

(56) References Cited

U.S. PATENT DOCUMENTS

| | | | |
|---|---|---|---|
| 6,715,833 B2 | 4/2004 | Ito | |
| 6,902,235 B2 * | 6/2005 | Rohee | B60N 2/08 248/424 |
| 7,090,188 B2 | 8/2006 | Severini et al. | |
| 7,300,109 B2 | 11/2007 | Hofmann et al. | |
| 7,309,107 B2 * | 12/2007 | Smith | B60N 2/0705 248/429 |
| 7,325,851 B2 * | 2/2008 | Ito | B60N 2/067 248/429 |
| 7,431,256 B2 * | 10/2008 | Yamada | B60N 2/0715 248/424 |
| 7,753,429 B2 | 7/2010 | Villeminey | |
| 7,815,159 B2 * | 10/2010 | Moriyama | B60N 2/0727 248/430 |
| 7,918,507 B2 | 4/2011 | Schmale | |
| 7,922,143 B2 * | 4/2011 | Park | B60N 2/0705 248/424 |
| 7,992,834 B2 * | 8/2011 | Kojima | B60N 2/0727 248/424 |
| 7,993,060 B2 * | 8/2011 | Kojima | B60N 2/0727 248/429 |
| 8,033,520 B2 * | 10/2011 | Fujieda | B60N 2/0727 248/430 |
| 8,191,850 B2 * | 6/2012 | Wetzig | B60N 2/0727 248/429 |
| 8,282,151 B2 * | 10/2012 | Kojima | B60N 2/0727 248/429 |
| 8,360,383 B2 * | 1/2013 | Kimura | B60N 2/0705 248/430 |
| 2004/0100388 A1 * | 5/2004 | Yoshida | B60N 2/002 340/686.1 |
| 2009/0080814 A1 | 3/2009 | Kojima et al. | |
| 2009/0236488 A1 * | 9/2009 | Koga | B60N 2/067 248/429 |
| 2010/0207419 A1 * | 8/2010 | Kojima | B60N 2/0727 296/65.13 |
| 2011/0000393 A1 * | 1/2011 | Gramatte | E01B 25/24 104/91 |
| 2011/0101194 A1 * | 5/2011 | Wetzig | B60N 2/0727 248/429 |
| 2012/0326000 A1 * | 12/2012 | Kojima | B60N 2/0727 248/429 |

FOREIGN PATENT DOCUMENTS

| | | |
|---|---|---|
| DE | 202005019749 U1 | 3/2006 |
| DE | 202009002972 U1 | 8/2009 |
| DE | 102008012888 A1 | 9/2009 |
| EP | 0094438 A1 | 11/1983 |
| EP | 2196354 A1 | 6/2010 |
| FR | 2852896 A1 | 10/2004 |
| WO | 2009/109316 A1 | 9/2011 |

* cited by examiner

SEAT TRACK HAVING SELECTABLE END STOP POSITIONS

CROSS-REFERENCE TO RELATED APPLICATIONS

This application claims the benefit of German Patent Application No. 102012201584.1, filed Feb. 3, 2012, the disclosure of which is incorporated herein by reference.

BACKGROUND OF THE INVENTION

This invention relates in general to seat tracks for adjusting the position of a seat relative to a support structure. In particular, this invention relates to a longitudinally adjustable seat track assembly having intermediate stops that are selectable to provide different seat travel lengths or positions relative to the support structure.

Seats are provided to carry occupants. The seats may also be equipped with moveable mounting structures that accommodate fore and aft movement of the seat, in part, to provide increased seating comfort for the occupant. For example, vehicles are known to be provided with moveable seats for positioning the occupant within comfortable reach of the controls. Each of the moveable mounting structures is typically a pair of elongated members, such as rails, that cooperate to form a seat track. One rail of the seat track is mounted to a support structure, such as a foundation, floor, or other stationary structure. The other rail of the seat track is mounted to a portion of the seat. Slides may be provided between the two rails to ease movement effort of the seat. The slides may consist of bearings, bushings, or other friction reducing elements.

The seat tracks may also include end stops that limit the range of adjustment in order to prevent the rails from being over-extended. Typically, the end stops are formed in unique locations particular to each seat/track assembly for a vehicle application. The broad variety of vehicle applications generally inhibits commonizing basic track configurations due to the range and variable placement of the end stops. Some seat tracks may provide for variability in locating the position of the end stop relative to one of the tracks, such as the seat track disclosed in published U.S. Patent Application 2011/0101194 to Wetzig et al. The Wetzig et al. seat track provides a separate end stop component that is selectively attached to a pre-formed location on one of the seat track rails. Thus, the locations and arrangement of the range of end stop locations is limited to the pre-formed attachment points provided.

It would be desirable to provide a seat track assembly that can be configured to provide different travel lengths using common rail components. It would further be desirable to provide for a wide range of different travel lengths in a seat track assembly without the use of discrete attachment points.

SUMMARY OF THE INVENTION

This invention relates to longitudinally adjustable seat tracks having end stops that determine the ends of travel of a moveable rail relative to a stationary rail.

In a first aspect, a seat track assembly includes a moveable rail and a stationary rail. The moveable rail is supported on the stationary rail for selective movement relative thereto. The stationary rail has at least one intermediate stop tab that is deformable between a bypass position, wherein the intermediate stop tab does not interfere with movement of the moveable rail, and an intermediate end stop position, wherein the intermediate end stop tab interferes with the moveable rail relative to the stationary rail. The intermediate stop tab may be one or more stop arms that are selectively bent into a travel path of the moveable rail. One of the moveable and stationary rails may also include a structure that engages the intermediate stop tabs to limit the travel length of the moveable rail relative to the stationary rail.

In a second aspect, a seat track assembly includes a first rail and a second rail. The first rail defines a longitudinal track axis and has an extending structure selectively deployable along the track axis. The second rail supports the first rail for telescopic relative movement along the longitudinal track axis. The extending structure of the first rail is configured to selectively engage a portion of the second rail to limit an overall travel length of the first rail relative to the second rail. The extending structure is located between the first and second rails and engages one or more intermediate stop tabs to limit the travel length of the first rail relative to the second rail.

In another aspect, a method of forming a seat track assembly includes the steps of:

determining a travel midpoint along a longitudinal track axis of a first rail relative to a second rail;

deploying an extending structure on the first rail at the determined travel midpoint along the longitudinal track axis;

determining a first end of travel length of the first rail relative to the second rail, and selecting and deforming a first intermediate stop tab from a plurality of intermediate stop tabs formed along the longitudinal track axis of the second rail such that the extending structure engages the first intermediate stop tab at the first end of travel;

assembling the first rail onto the second rail for relative telescopic movement along the longitudinal track axis; and providing an end stop on the second rail to limit the travel length of the first rail.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
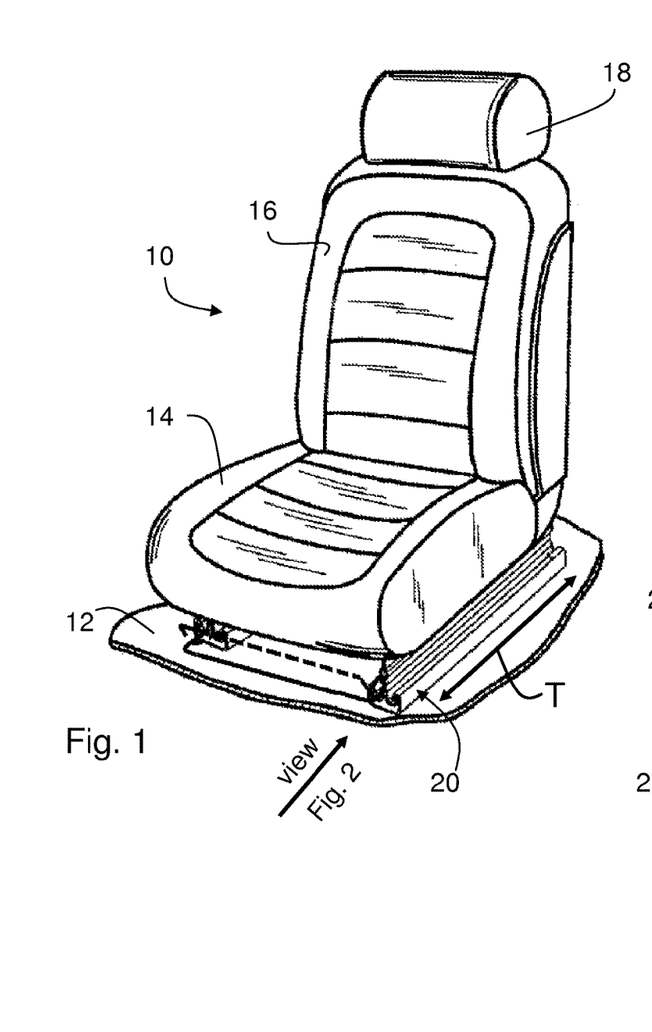
FIG. 1 is a perspective view of a seat including a first embodiment of a seat track assembly having a variable end stop positioning system.
Figure 5A:
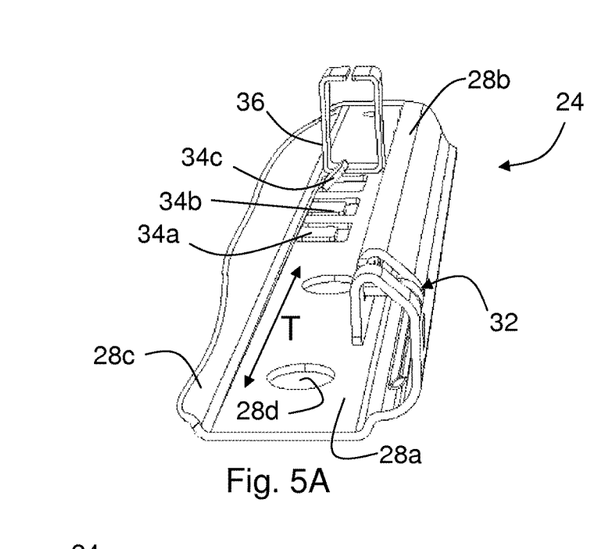
FIG. 5A is a sectional, perspective view of a first rail and stop tab of the first embodiment of the seat track assembly configured to engage a variable-position stop bracket in a first position.
Figure 5B:
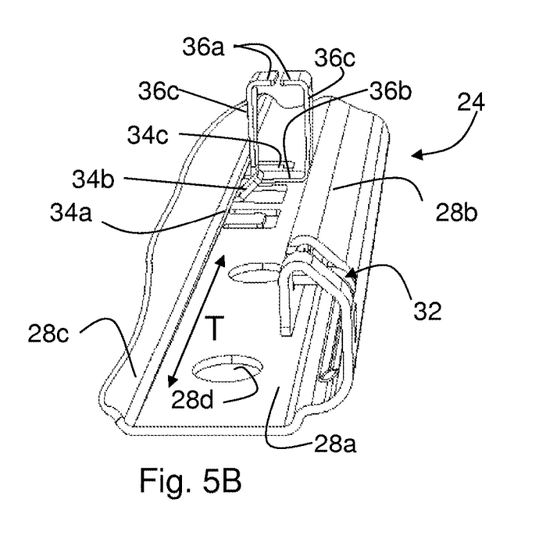
FIG. 5B is a sectional, perspective view of a first rail and stop tab of the first embodiment of the seat track assembly configured to engage the variable-position stop bracket in a second position.

Referring now to the drawings, there is illustrated in FIG. 1 a seat, indicated generally at 10. The illustrated embodiment of the seat 10 is a vehicular seat which is mounted on a floor 12 or other support surface of a vehicle. The seat includes a seat bottom 14 and a seat back 16. The seat back 16 may be may be moveable, such as pivotable, or fixed relative to the seat bottom 14. The seat back 16 is shown having a headrest 18 attached thereto, opposite the seat bottom 14. The headrest 18 may be a separate component or integrated into the seat back 16. A seat track assembly, shown generally at 20, is attached between the seat bottom 14 and the floor 12. The seat track assembly 20 is configured for selective relative movement of the seat 10 relative to the floor 12. While shown and described in the context of a vehicle seat, the seat track assembly 20 described herein is suitable for use in any environment to provide selective relative movement of a seat relative to the mounting surface. The illustrated seat track assembly 20 is a longitudinally adjustable seat support that is structured and configured to allow the seat 10 to be positioned, for example, in one or more longitudinal use positions along a track axis T, as shown in FIGS. 1, 5A, and 5B.

Figure 2:
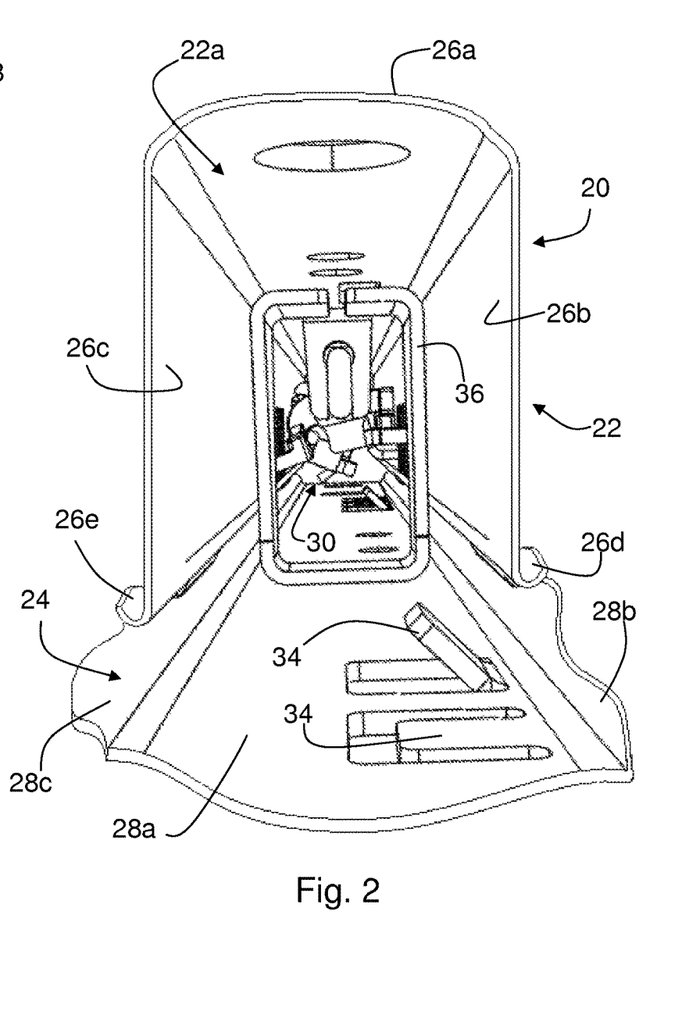
FIG. 2 is an end view of the seat track assembly of FIG. 1 showing the variable end stop positioning system.
Figures 3, 4A:
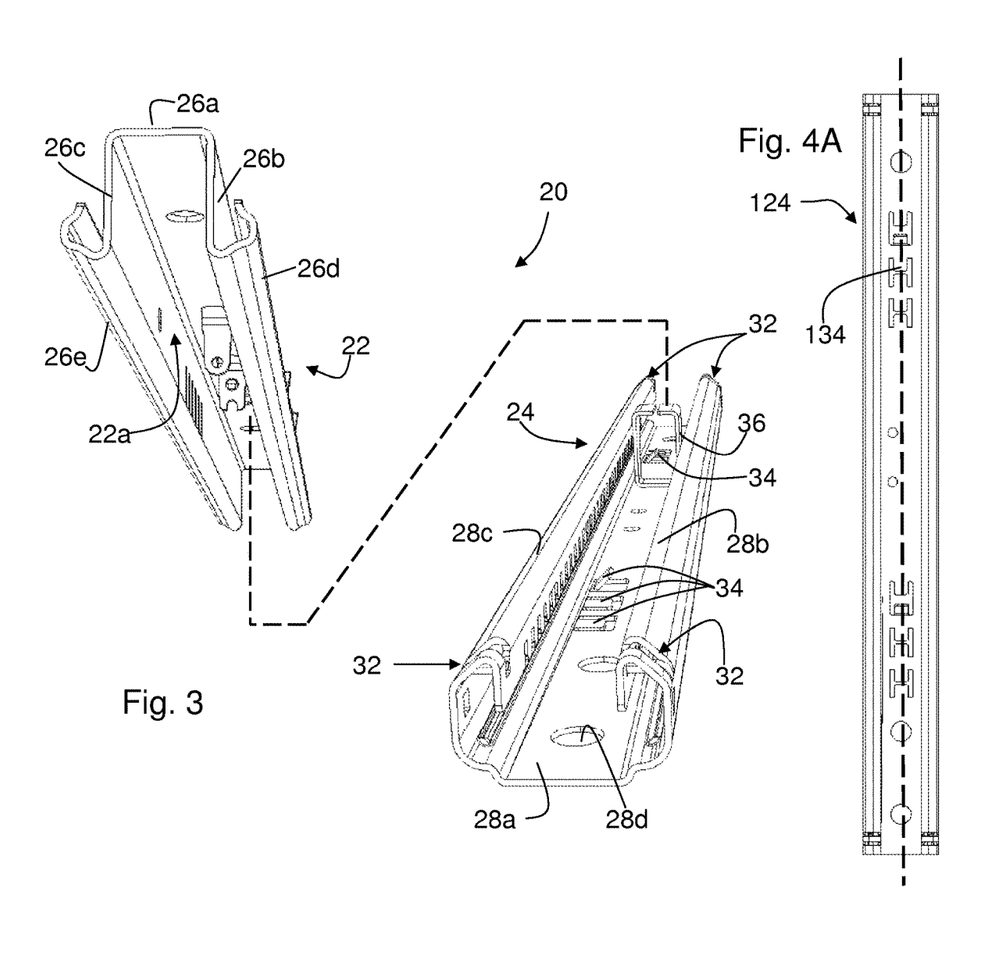
FIG. 3 is an exploded, perspective view of the seat track assembly of FIG. 2.
FIG. 4A illustrates a plan view of a second embodiment of stationary rail showing an alternative intermediate stop tab shape and orientation.

Referring now to FIGS. 2 and 3, the seat track assembly 20 includes a first rail 22 and a second rail 24 that are telescopically engaged for relative movement therebetween. In the illustrated embodiment, the first rail 22 is a moveable rail attached to the seat bottom 14. The moveable rail 22 supports the seat 10 for movement relative to the second rail 24. The second rail 24 is illustrated as a stationary rail attached or otherwise fixed to the floor 12. As described herein, elements related to adjusting or limiting the relative movement of the moveable and stationary rails 22 and 24 may be provided on either of the rails if desired.

The moveable rail 22 includes a generally "U"-shaped center portion that includes a seat mounting wall 26a connecting two spaced-apart wall sections 26b and 26c. The walls 26a, 26b, and 26c of the U-shaped center portion of the moveable rail 22 define an interior cavity 22a. Slide arms 26d and 26e extend respectively outwardly from the spaced-apart wall sections 26b and 26c. The stationary rail 24 includes a track mounting wall 28a and slide support arms 28b and 28c that extend outwardly from the track mounting wall 28a. The track mounting wall 28a includes one or more mounting structures 28d that facilitate the attachment of the stationary rail 24 to the floor 12. The mounting structures 28d may be holes formed through the track mounting wall 28a, as shown in FIGS. 2, 3, 5A, 5B, and 6, to permit a fastener to secure the track to the floor 12. Alternatively, the mounting structures 28d may be fasteners that extend through the track mounting wall 28a, or any other desired structure. The slide arms 26d, 26e, and 28b, 28c may be configured other than shown and may extend inwardly within the interior cavity 22a of the U-shaped center portion 22. The slide arms 26d and 26e are configured to support the moveable and stationary rails 22 and 24 for relative longitudinal movement along the track axis T when telescopically engaged together. The slide arms 26d, 26e, and 28b, 28c may include friction reducing elements such as ball bearings, friction reducing polymer materials or coatings, opposed pole magnets, or any other desired structure that facilitates movement of the moveable rail 22 relative to the stationary rail 24.

A latch assembly 30 is configured to be moved between a released position, which permits relative movement of the moveable and stationary rails 22 and 24, and a latched position, which fixes the position of the moveable rail 22 relative to the stationary rail 24. The latch assembly 30 may be any latch structure, such as the latch assembly described in U.S. patent application Ser. No. 13/219,989, filed Aug. 29, 2011, the disclosure of which is incorporated herein by reference in its entirety. In the embodiment shown in FIG. 2, the latch assembly 30 includes fingers that extend into cooperating windows and spaces formed into the walls 26b,c and the slide arms 28b,c to fix or release the moveable rail 22 relative to the stationary rail 24. The latch assembly 30 may be attached to the moveable rail 22 either within the interior cavity 22a of the U-shaped center portion 22 or anywhere suitable on the exterior of the moveable rail 22. Alternatively, the latch assembly 30 may be carried by the stationary rail 24 and the moveable rail 22 may include the appropriate cooperating engagement members (i.e. windows or teeth).

The stationary rail 24 further includes end stops 32, shown as being formed on each end of each of the slide arms 28b and 28c of the stationary rail 24. These end stops 32 determine the extreme ends of travel of the moveable rail 22 relative to the stationary rail 24, shown in FIG. 6 as dimension "A". The end stops 32 are illustrated as stamped arms that extend into the travel path of the moveable rail 22 and contact the slide arms 26d and 26e to prevent further axial movement. The end stops 32 may be formed into the stationary rail 22 or may be an additional component (not shown), such as a screw, bolt, end cap, and the like that will limit the axial movement of the moveable rail 22 relative to the stationary rail 24.

Figure 4B:
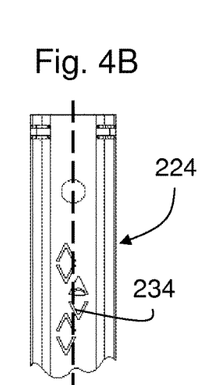
FIG. 4B illustrates a plan view of a third embodiment of stationary rail showing an alternative intermediate stop tab shape and orientation.
Figure 4C:
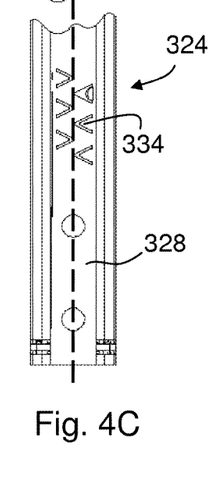
FIG. 4C illustrates a plan view of a fourth embodiment of stationary rail showing an alternative intermediate stop tab shape and orientation.

The stationary rail 24 also is shown having a plurality of intermediate stop tabs 34 formed in the track mounting wall 28a. In the first embodiment shown in FIGS. 3, 5A, 5B, and 6, the intermediate stop tabs 34 are stamped projections that extend from a side of the track mounting wall 28a adjacent to the slide arm 28c generally perpendicularly toward a longitudinal centerline of the stationary rail 24. The intermediate stop tabs 34 are configured to be selectively deformed or bent from a bypass position that does not interfere with movement of the moveable rail 22 relative to the stationary rail 24 to an intermediate end stop position. In the intermediate end stop position, the intermediate stop tab 34 functions to limit the overall travel length of the moveable rail 22 relative to the stationary rail 24. This is contrasted with the latch assembly 30 which functions to selectively fix the position of the moveable rail 22 relative to the stationary rail 24 within the overall travel length. As will be discussed below, the intermediate stop tabs 34 are identified in FIGS. 5A, 5B, and 6 as intermediate stop tabs 34a, 34b, and so on to more easily identify and discuss a specific tab and its location. Though not required, the intermediate stop tabs 34 are generally configured to be similar to each other. FIGS. 4A, 4B, and 4C illustrate alternative embodiments of the intermediate stop tabs 34. In a second embodiment of the invention illustrated in FIG. 4A, intermediate stop tabs 134 of a stationary rail 124 may be formed to extend along the longitudinal centerline or at any angle desired. In a third embodiment of the invention illustrated in FIG. 4B, intermediate stop tabs 234 of a stationary rail 224 may be arranged in a staggered and offset pattern relative to the longitudinal centerline. In a fourth embodiment of the invention illustrated in FIG. 4C, intermediate stop tabs 334 of a stationary rail 324 extend in a staggered pattern from opposing outer sides of a track mounting wall 328. The alternating or staggered patterns of intermediate stop tabs 234 and 334 may permit a greater choice of stop selection points.

It should be understood that the various embodiments of intermediate stop tabs, and likewise the various extending structures, described herein may be provided on either the moveable or stationary rails, as desired. For example, a variable-position stop bracket 36 (described in detail below) may be attached to the stationary rail 24 and the seat mounting wall 26a of the moveable rail 22 may include the intermediate stop tabs 34.

Referring again to the first and second embodiments of FIGS. 3 and 4A, though shown as being generally rectangular in shape, the intermediate stop tabs 34 may be any shape that permits the tabs 34 to limit the travel of the moveable rail 22 relative to the stationary rail 24. As shown in FIGS. 4B and 4C of the third and fourth embodiments, respectively, the intermediate stop tabs 234 and 334 of the stationary rails 224 and 324, respectively, are triangular in shape. The embodiment of stationary rail 224 shows the intermediate stop tabs 234 positioned in an offset pattern along the track longitudinal centerline. The intermediate stop tabs 34 are formed such that they may be bent out of the plane of the track mounting wall 28a. The intermediate stop tabs 34 are formed at predetermined intervals along portions of the track mounting wall 28a. The relative spacing between the stopping points of the moveable rail 22, may be varied for a given track length and as required for a particular vehicle application.

Figure 7:
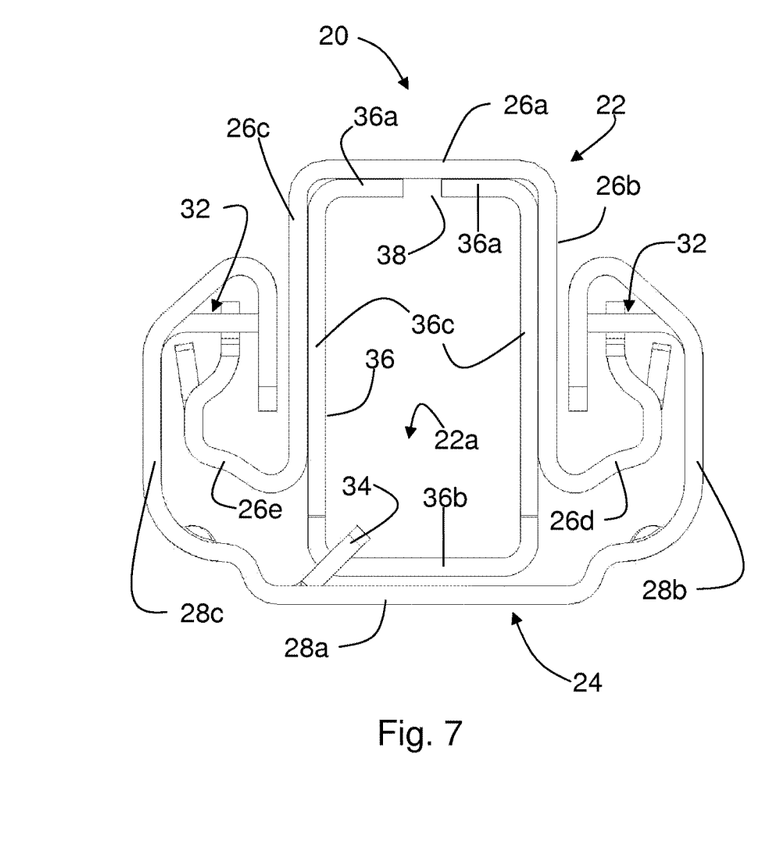
FIG. 7 is an end view of the first and second rails and the variable end stop positioning system of FIG. 1.

As shown in FIGS. 2, 3, and 7, the moveable rail 22 includes an extending structure, illustrated as the variable-position stop bracket 36, that is configured to extend from the moveable rail 22 into the inner cavity 22a in order to selectively contact the intermediate stop tabs 34 of the stationary rail 24 that have been bent out of the plane of the track mounting wall 28a. The stop bracket 36 is fixed to a portion of the moveable rail 22. In the illustrated embodiment, the stop bracket 36 is configured as a generally rectangular element that is fixed to at least one of the seat mounting wall 26a and the wall sections 26b and 26c. The stop bracket 36, however, may be formed as any shape and may be attached to other locations on the moveable rail 22 to accommodate various rail and slide configurations, such as the variations described above. The illustrated stop bracket 36 includes a pair of top flanges 36a, a bottom wall 36b, and a pair of opposed side walls 36c.

Figure 6:
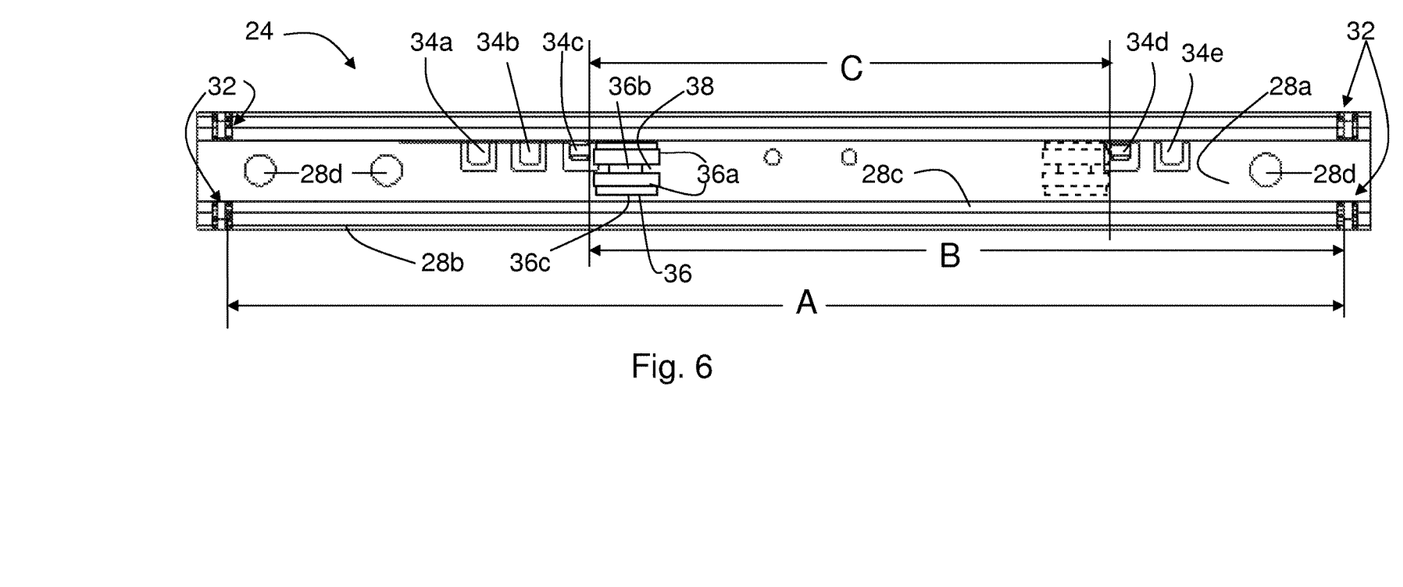
FIG. 6 is a plan view of the first rail of the first embodiment of the seat track assembly showing different positions of the stop bracket.

As shown in FIG. 6, the top flanges 36a extend a longer distance along the track axis T than the bottom wall 36b, although such is not required. The longer top flange lengths provide a greater area to attach the stop bracket 36 to the seat mounting wall 26a or other portion of the second rail 22. The greater attachment area of the top flange 36a, in turn, provides a greater resistance to bending moments as may occur when the bottom wall 36b contacts the intermediate stop tabs 34 in the manner described below. The stop bracket 36 may be attached by any means, such as welding, adhesive bonding, riveting, fastening, and the like. Alternatively, the side walls 36c may have projections (not shown) that engage corresponding selected holes (not shown) formed into the walls 26b and 26c of the second rail 22. The stop bracket 36 may include a resilient member (not shown) that extends and retains the projections, configured as separate elements, in the selected holes. Alternatively, the projections may be integrally formed into the side walls and rely on the resilient characteristic of the stop bracket 36 to be retained. To facilitate installation and provide a fixturing function, the top flange 36a may include a slit 38 extending between the top flanges 36a. The width of the top flange 36a may be wider than the bottom wall 36b. Thus, the wider top flange 36a and the slit 38 permit the side walls 36c, for example, to frictionally engage the wall sections 26b and 26c of the second rail 22 and allow the top flanges 36a to deflect into conformance with upper width of the U-shaped section of the second rail 22.

The stop bracket 36 is fixed to the moveable rail 22 in a location that, in conjunction with the intermediate stop tabs 34 (identified in FIGS. 5A, 5B, and 6 as intermediate stop tabs 34a-34e to clearly identify the relative tab locations) or end stops 32 selected as the travel stops, provide the length of travel of the moveable rail 22 relative to the stationary rail 24. Additionally, the travel offset (i.e. the axial distance between the longitudinal centers of the moveable and stationary rails 22 and 24 at the travel length midpoint) may be shifted fore or aft as desired. The length of travel and the travel offset of the moveable rail 22 are determined by the specific vehicle requirements. As shown in FIG. 6, the overall length of travel A of the moveable rail 22 may be shortened, for example, to dimension "B" by selecting and bending the intermediate stop tabs 34c from the available intermediate stop tabs 34a-e into the internal cavity 22a. The travel distance may further be shorted to a travel length of "C" by bending two of the intermediate stop tabs 34c and 34d into position, as shown. The stop bracket 36 will travel between the two intermediate stop tabs 34c and 34d by the travel length distance "C" thus further limiting the movement of the moveable rail 22. The location where the stop bracket 36 is attached along the length of the moveable rail 22 will determine the longitudinal offset of the travel midpoint of the moveable rail 22 relative to the stationary rail 24 along the track axis T. It should be understood that the tabs 34 and stop bracket 36 attachment may be reversed between the moveable and stationary rails 22 and 24 if so desired.

Referring to FIGS. 5A, 5B, and 6, the intermediate stop tabs 34a-e are selected to both determine the travel distance limit of the moveable rail 22 relative to the stationary rail 24 and determine where that travel distance is positioned relative to the overall length or mounting structures 28d of the stationary rail 24. As show in FIGS. 5A and 5B, the intermediate stop tabs 34 may be selected at a desired location along the track axis T and bent out of the plane of the track mounting wall 28a. FIG. 5A shows a first possible selection of intermediate stop tab 34c, which is bent into a stopping position to provide a foreshortened longitudinal travel distance for the moveable rail 22. FIG. 5B shows a second possible selection of intermediate stop tab 34b, which is bent into the stopping position representing a more forward (or rearward) travel distance. A similar selection of any of the intermediate stop tabs 34 may be made at each end of the stationary rail 24.

Figure 8:
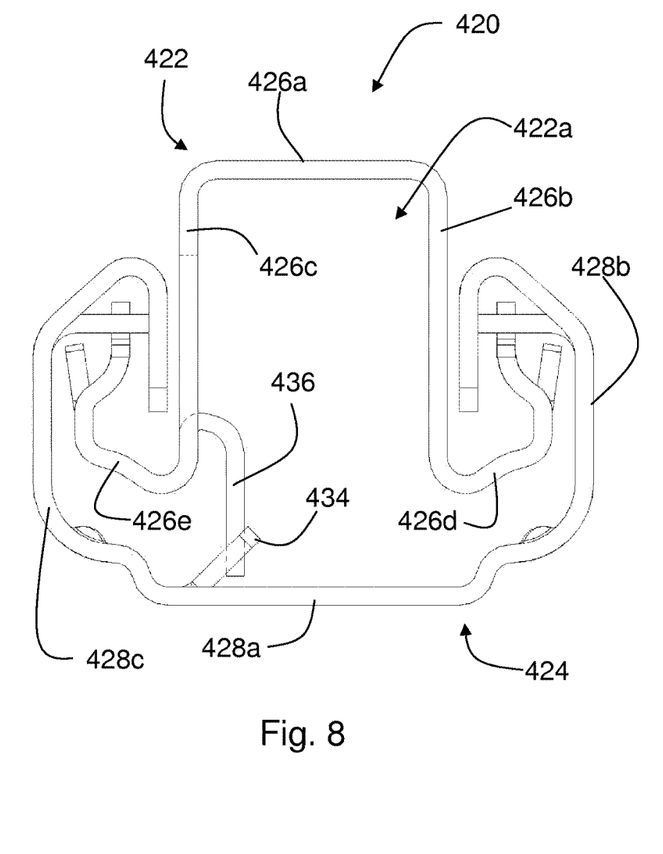
FIG. 8 is an end view of a fifth embodiment of a seat track assembly having a variable end stop positioning system.

Referring now to FIG. 8, there is illustrated a fifth embodiment of a seat track, shown generally at 420, having a variable end stop positioning system. The seat track 420 includes a moveable rail 422 and a stationary rail 424, similar to the moveable and stationary rails 22 and 24, described above. The moveable rail 422 includes a seat mounting wall 426*a* connecting two spaced-apart wall sections 426*b* and 426*c*. The walls 426*a*, 426*b*, and 426*c* form a U-shaped center portion of the moveable rail 422 that defines an interior cavity 422*a*. Slide arms 426*d* and 426*e* extend outwardly from the spaced-apart wall sections 426*b* and 426*c*. The stationary rail 424 includes a track mounting wall 428*a* and slide support arms 428*b* and 428*c* that extend outwardly from the track mounting wall 428*a*. A plurality of selectable intermediate stop tabs 434, similar to the tabs 34 described above, is formed into the track mounting wall 428*a*. The moveable rail 422 includes an alternative extending structure, illustrated as a stop arm 436 that extends from at least one of the side walls 426*b* and 426*bc*. The stop arm 436 is bent into the path between the intermediate stop tabs 434 and functions in a similar manner to the stop bracket 36 described above. A plurality of stop arms 436 may be formed into the side walls 426*b*,*c* so that a selection may be made of the stop arm or arms 436 that are bent into the travel path of the moveable rail 422. Also, more than one stop arm 436 may be bent into the travel path. One of the bent stop arms 436 may extend from one side wall 426*b* and contact a corresponding intermediate stop tab 434 of the track mounting wall. Similarly, another bent stop arm 436 may extend from the opposite wall 426*c* and contact another intermediate stop tab 434 extending from the track mounting wall 428*a*. Alternatively, the stop arm 436 may extend into the interior cavity from another portion of the moveable rail 422, such as the seat mounting wall 426*a*.

Figure 9:
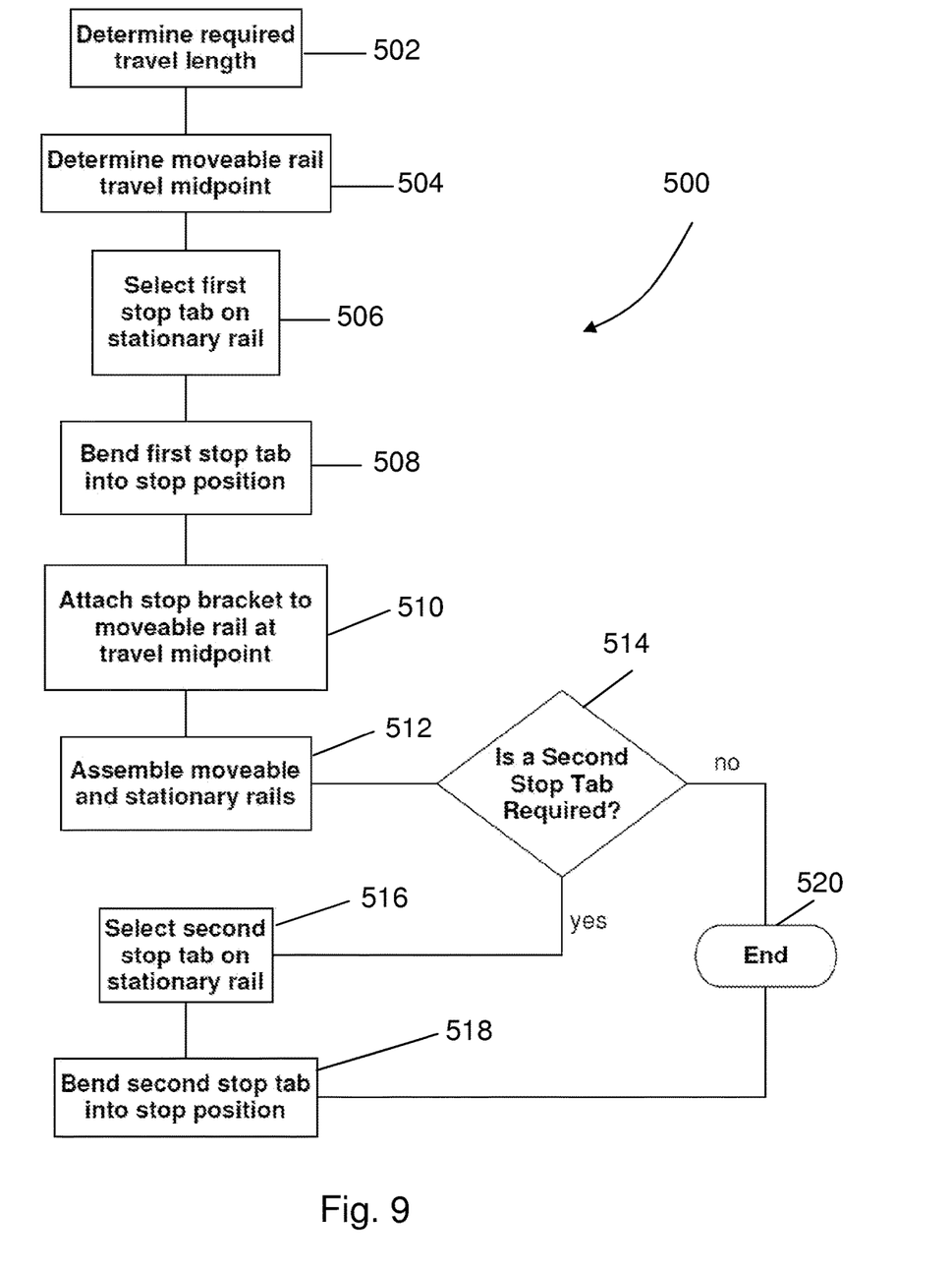
FIG. 9 is a flow chart of a method of manufacturing a seat track assembly having a variable stop positioning system.

Referring now to FIG. 9, a flow chart illustrates the steps of a seat track travel adjustment method 500 utilizing the various embodiments of the variable end stop positioning systems described above. At step 502, a travel length for the seat track is determined based on vehicle design requirements. This travel length may also be determined relative to the mounting structures of the stationary rail in order to position the seat track assembly in proper relation to the vehicle floor 12. Next, a travel midpoint of the moveable rail is determined at step 504. Alternatively, instead of determining the travel midpoint separately in order to attach the stop bracket or bend the stop arm, the moveable rail end of travel points may be determined. This, in turn, will determine, the stop bracket mounting point relative to the location of the selected tabs or end stops. A first intermediate stop tab selection is made at step 506 based on the travel length and travel midpoint determinations. The selection step 506 may only identify the tab or stop point and not necessarily be associated with moving the selected tab into position. At step 508, the selected intermediate stop tab, associated with the first stop position of the moveable rail, is bent into position. At step 510 the stop bracket is attached to the moveable rail at the travel midpoint. The travel midpoint location will account for any offsets of the moveable rail relative to the stationary rail. The moveable rail is assembled onto the stationary rail at step 512. A determination is made at step 514 if a second stop tab is required for the particular track assembly. If so, the second stop tab is selected (step 516) and bent into position (step 518). If not, the process ends (step 520) and the assembled track is complete.

It should be understood that the above steps may be taken in a different order if desired. For example, step 508 of bending the first stop tab may be done after the rail assembly step 512. This may be desirable if one of the travel stops is the end stop, which may be formed at an earlier production step.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A seat track assembly comprising:
a first rail and a second rail that are engaged with one another for relative movement, wherein:
the first rail has a plurality of different variable-position stop bracket positions provided therein;
the second rail has both a first plurality of intermediate stop tabs and a second plurality of intermediate stop tabs provided therein that are located on opposite sides of the plurality of the different variable-position stop bracket positions;
a variable-position stop bracket is secured to the first rail at a selected one of the plurality of the different variable-position stop bracket positions, wherein the variable position stop bracket is generally rectangular in shape and includes a bottom wall, a pair of side walls respectively extending from the bottom wall, and a pair of top flanges respectively extending from the pair of side walls inwardly toward one another;
each of the first plurality of intermediate stop tabs is deformable from a bypass position, wherein it is positioned so as to not be able to engage the variable-position stop bracket secured to the first rail and thereby not be able to interfere with relative movement of the first and second rails relative to the first rail, to an intermediate end stop position, wherein it is positioned so as to be able to engage the variable-position stop bracket secured to the first rail and thereby be able to interfere with relative movement of the first and second rails relative to the first rail; and
each of the second plurality of intermediate stop tabs is deformable from a bypass position, wherein it is positioned so as to not be able to engage the variable-position stop bracket secured to the first rail and thereby not be able to interfere with relative movement of the first and second rails relative to the first rail, to an intermediate end stop position, wherein it is positioned so as to be able to engage the variable-position stop bracket secured to the first rail and thereby be able to interfere with relative movement of the first and second rails relative to the first rail.

2. The seat track assembly defined in claim 1 wherein a width defined by the pair of top flanges is wider than a width defined by the bottom wall.

3. The seat track assembly defined in claim 1 wherein the variable-position stop bracket is secured to the first rail at the selected one of the plurality of the different variable-position stop bracket positions by one of welding, adhesive bonding, riveting, or fastening.

4. The seat track assembly defined in claim 1 wherein the first rail includes a mounting wall connecting two spaced-apart wall sections, and wherein the variable position stop bracket is fixed to at least one of the mounting wall and the two spaced-apart wall sections.

5. The seat track assembly defined in claim 4 wherein the variable position stop bracket is fixed to the mounting wall of the first rail.

6. The seat track assembly defined in claim 4 wherein the variable position stop bracket is fixed to at least one of the two spaced-apart wall sections of the first rail.

7. The seat track assembly defined in claim 1 wherein one of the first rail and the second rail includes an end stop provided on each end thereof so as to limit a furthest length of travel of the other of the first rail and the second rail.

* * * * *